United States Patent [19]
Phipps

[11] 3,871,812
[45] Mar. 18, 1975

[54] FOAM EXTRUSION DIE

[76] Inventor: Arthur L. Phipps, 6204 Raymond Ct., Erie, Pa. 16505

[22] Filed: Aug. 2, 1972

[21] Appl. No.: 277,407

[52] U.S. Cl............. 425/466, 425/381, 425/817 C
[51] Int. Cl................................................ B29d 7/04
[58] Field of Search...... 264/51; 425/466, 4 C, 461, 425/465, 817 C, 192, 464, 380, 376; 164/82

[56] References Cited
UNITED STATES PATENTS

| | | |
|---|---|---|
| 1,715,859 | 6/1929 | Norton............................. 425/466 |
| 2,320,496 | 6/1943 | Wechsler........................... 425/461 |
| 3,528,128 | 9/1970 | Murakami et al................. 425/464 |
| 3,628,596 | 12/1971 | Easton et al....................... 164/82 X |

Primary Examiner—R. Spencer Annear
Assistant Examiner—Mark Rosenbaum

[57] ABSTRACT

An extrusion die is disclosed. The die has four adjustable lips in the form of two substantially identical pairs of lips. The lips are adjustable toward and away from each other to form extruded shapes such as boards, planks and logs. One pair of lips may be in the form of laterally spaced keys.

20 Claims, 27 Drawing Figures

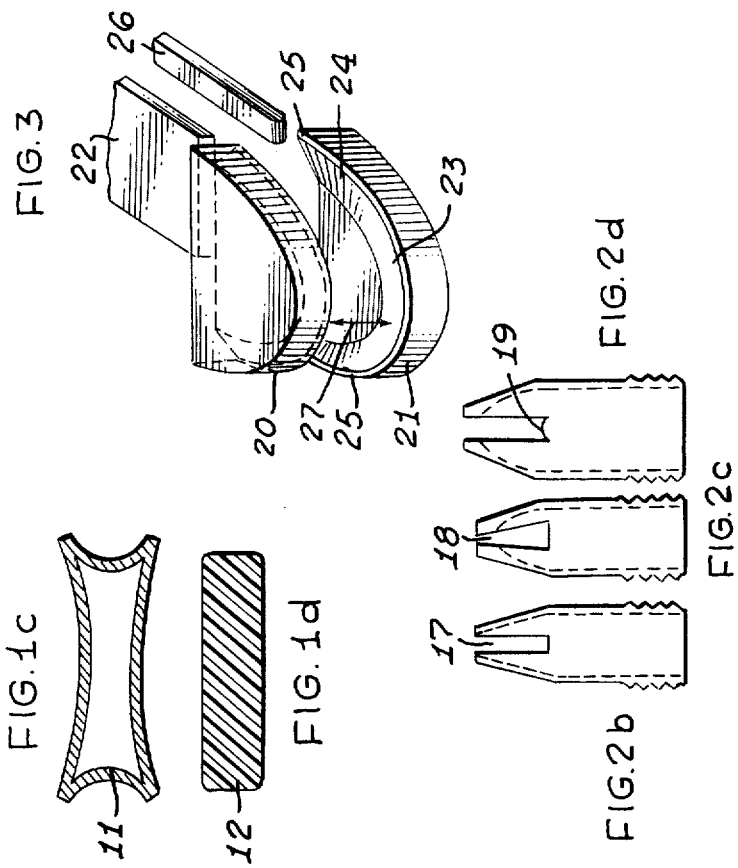
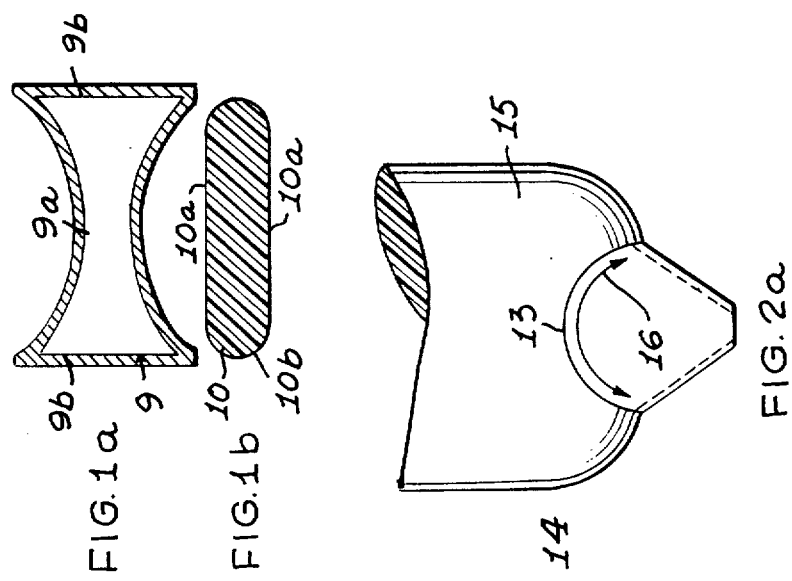

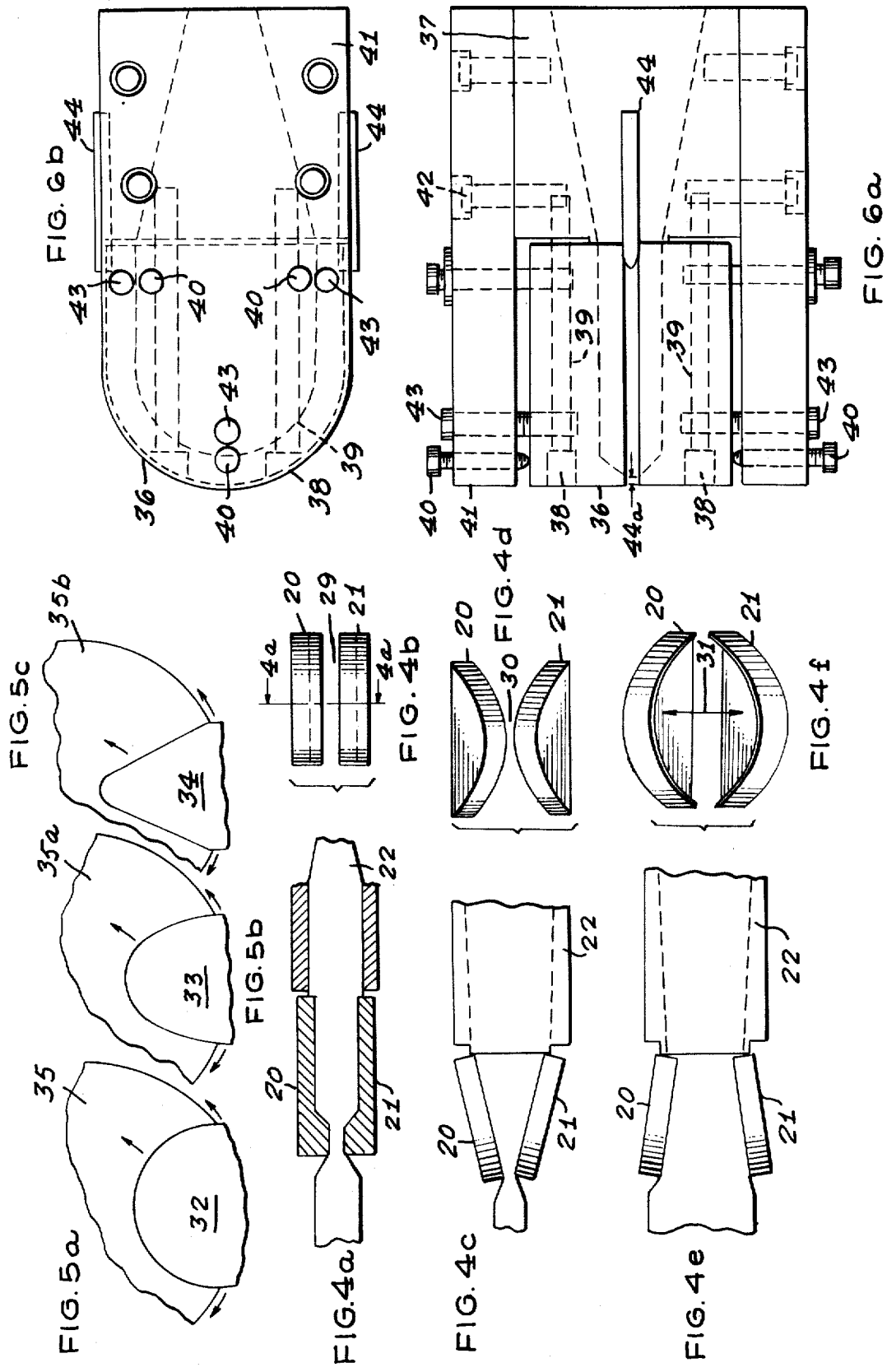

FOAM EXTRUSION DIE

REFERENCE TO PRIOR ART

U.S. Pat. No. 3,121,130 to F. E. Wiley et al., issued Feb. 11, 1964, shows a strand die for the purpose of separating the elements in an extrusion into discrete units or strands, which knit together during foaming to produce more or less homogeneous boards and planks.

An article on Page 646, Modern Plastics Encyclopedia for 1965, Vol. 42, No. 1A, McGraw-Hill, Inc., New York, discusses die design allowances for non-foamed thermoplastic profile extrusion.

GENERAL STATEMENT OF INVENTION

Thermoplastic foams are often generated by the process of extrusion wherein the hot, melted plastic has been thoroughly mixed with a blowing agent by the time the mixture leaves the extruder screw. The hot, viscous, melted mixture is forced under pressure through a "die." As the mixture exits from the die, the pressure is released from the mixture, and the blowing agent expands in tiny pockets or cells thereby creating the foam. Boards and planks of extruded thermoplastic foam have realized large commercial success.

A foam board, plank, or log of rectangular cross section cannot be extruded using a die opening of rectangular cross section. The non-expanded material issuing from a rectangular die opening becomes somewhat oval shaped upon foaming. This is because a rectangular cross section, if geometrically and equally expanded in all directions, will project only the original straight edges of the rectangle outwards while the corners become radii of ever-increasing length with their centers being the original sharp corners. In practice, even this phenomenon cannot be realized since the expansion is subject to certain restraints; one such is that the outer foam surface acts as if it were a "balloon-like" skin which would prefer a circular cross section. This aggravates the tendency for the rounded corners to round even more, thus forcing the expanding mass toward a more circular cross section.

Several tests were performed to demonstrate the effect of different rectangular die cross sections upon the foam cross section. A thin rectangular film gap measuring 1.5 by 0.01 inches produced a foam wavy in cross section with several wave-like convolutions having a thickness of about 0.13 inches at the center and tapering down to quite sharp edges. The wave-like cross section was observed as fairly uniform corrugations running lengthwise along the board.

A thick rectangular film gap, measuring 1.5 by 0.02 inches was next tested; it produced a foam board whose cross section had a single wave-like convolution, measuring 0.4 inches thick at the center and tapering to about 0.1 inch at the edges. The convolution was observed as a single corrugation running lengthwise along the board.

A very thick rectangular film gap measuring 0.9 inches wide by 0.06 inches thick was then selected. This gap was so thick compared to its length as more properly to be called a slot. It produced a foam oval in cross section and about 0.75 inches thick in the center by 2.2 inches wide.

Finally, a square gap cross section, measuring 0.12 by 0.12 inches was selected; the foam cross section from this gap was nearly circular with a nominal 0.5 inch diameter.

OBJECTS OF THE INVENTION

It is an object of the invention to provide an extrusion die that will extrude a member of substantially a predetermined shape.

Another object of the invention is to provide an improved extrusion die.

Another object of the invention is to provide an extrusion die that is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1a is a front view of a gap shaped as a bow tie.

FIG. 1b is a cross sectional view of an extrusion made with a gap having the shape shown in FIG. 1a.

FIG. 1c is a front view of a gap shape used to produce the extrusion shown in FIG. 1d.

FIG. 1d is a cross sectional view of an extrusion made with a gap having the shape shown in FIG. 1c.

FIG. 2a is a top view of a die and an extrusion emitting therefrom.

FIG. 2b is a side view of a die and gap.

FIG. 2c is a side view of another die similar to FIG. 2b but with a different shaped gap.

FIG. 2d is a side view of another die having a different shape on the end of the gap from FIG. 2b and FIG. 2c.

FIG. 3 is an isometric partial view of lips forming a gap.

FIG. 4a is a cross sectional view taken on line 4A—4A of FIG. 4b.

FIG. 4b is a partial front view of the die shown in FIG. 3.

FIG. 4c is a schematic side view of the die shown in FIG. 4d.

FIG. 4d is a partial front view of the die shown in FIG. 3 with the lips adjusted to converge toward each other.

FIG. 4e is a schematic side view of the die shown in FIG. 4f.

FIG. 4f is a front view of the die shown in FIG. 3 with the lips adjusted to diverge away from each other.

FIGS. 5a, 5b, and 5c are top views of three different shapes of dies and their extrudate.

FIG. 6a is a side view of a semi-circular commercial type die.

FIG. 6b is a top view of a semi-circular commercial type die.

Figure 7A:
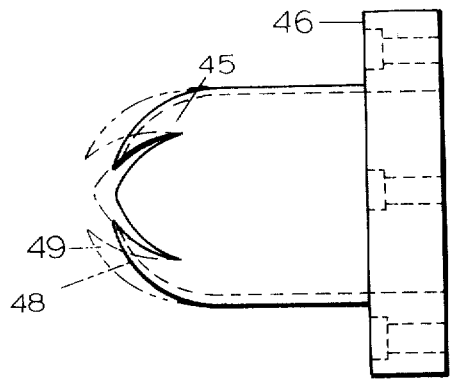

FIG. 7a is a side view of a specific embodiment of the invention.

Figure 7B:
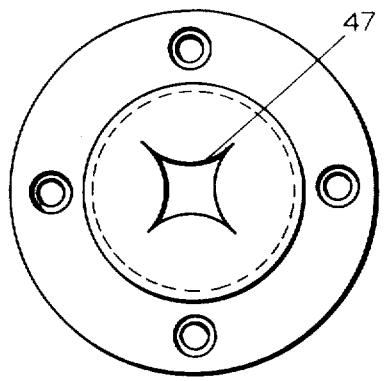

FIG. 7b is a front view of the embodiment shown in FIG. 7a.

Figure 8A:
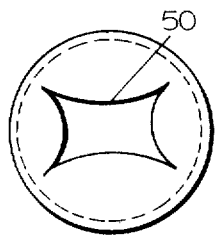

FIG. 8a is a front view of another embodiment of the invention.

Figure 8B:
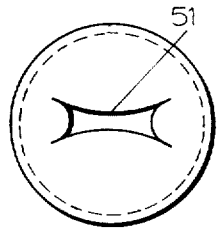

FIG. 8b is a front view of another embodiment of the invention.

Figure 9A:
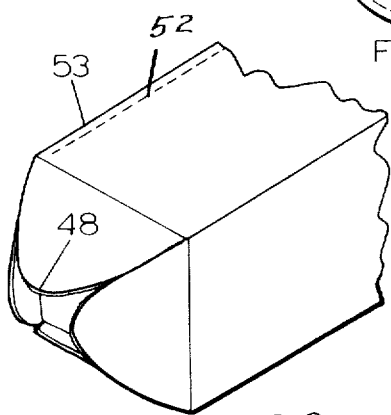

FIG. 9a is a partial isometric view of another embodiment of the invention.

Figure 9B:
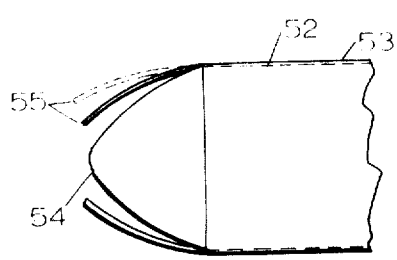

FIG. 9b is a side view of the embodiment shown in FIG. 9a.

Figure 9C:
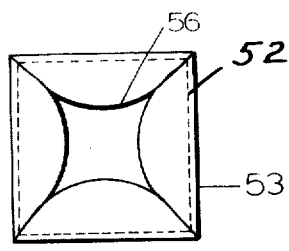

FIG. 9c is a front view of the embodiment of the invention shown in FIG. 9a.

DETAILED DESCRIPTION OF THE DRAWINGS

A bow tie shaped slot like FIG. 1a in a die 9 was then tested; it produced a foam board with cross section like FIG. 1b, with parallel, flat surfaces 10a but with convex rounded edges 10b. This die opening was 0.9 inches wide by 0.06 inches thick at the center at 9a and 0.12 inches thick at the ends 9b; the foam board was 0.5 inch thick by 2 inches wide. To square the edges, the bow tie die was altered such that the ends of the opening were also given the bow tie shape 11.

This die having slot 11, FIG. 1c, produced a foam board 12, FIG. 1d, which was nearly rectangular in cross section.

It has been discovered that only one rectangular cross section is obtainable from an entire family of geometrically expanded bow tie configurations of cross section. If foaming does not proceed as far as the unique rectangular cross section, a residual bow tie cross section is seen in the foam. If foaming proceeds beyond the rectangular cross section, the board begins to seek an oval cross section, or a circular cross section in the extreme cases.

Feedstock, rates, and other parameters dictate whether the foam board is rectangular, bow tie shaped, or oval shaped.

Considering the polymer to consist of tiny thread-like elements, each element would prefer to expand more or less independently and uniformly. In the dies discussed above, only the one element located at the center of the mass can hold its axial alignment with the die. All other elements are forced out of alignment, and especially those at the ends of the gap--these are pushed far out of alignment during the time they are also expanding. Their expansion toward the center forces more material toward the center which already has sufficient and doesn't need the additional contribution; this extra material must show up as increased thickness, corrugations, or both.

The ideal solution is to direct each element to its proper final location, separated from all other elements, and only then to permit all elements to expand in all directions simultaneously.

There is no way of separating the elements while maintaining the integrity of the extrudate; it then becomes axiomatic that the ideal solution can never be achieved. It can only be approximated.

If integrity is discounted for the purpose of argument, there remains only the objective of separating the elements into discrete units or strands, and releasing each near its ultimate axial location in the foam. A strand die for this purpose is described by F. E. Wiley, et al., in U.S. Pat. No. 3,121,130, Feb. 11, 1964.

Conversely, if integrity is considered a prime factor, discrete elements (strands) cannot be tolerated. The essence of the solution then becomes one of orienting insofar as possible the polymer flow within the die so that the maximum number of elements can achieve equality in the path they must take to their ultimate locus within the foam. For example, if the imaginary elements of foam near the ends of a die gap must rush far beyond the gap extremity, those elements may be pointed toward their objective as they are released from the die.

If the face of the die is curved, say, into a portion of a circle, then each element could be uniformly expanded along the radius of the arc.

Referring to FIG. 2a, a top view of a die having lips 13 is shown having a gap from which the tiny, imaginary elements 14 are issuing to produce a foam board 15 of nearly rectangular cross section.

A number of such dies were fashioned from pipe nipples forged into a wedge shape and ground back to the desired gap. The gap length 16 was semicircular for some of these dies while being triangular, parabolic, or different shapes for others. Some of the dies had a uniform gap thickness 17, FIG. 2b, others 18, FIG. 2c, were more nearly closed in the center than at the edges, and one had a bow tie 19, FIG. 2d, machined into the ends of the gap.

The family of dies in FIGS. 2b, 2c, and 2d performed quite well, but it became apparent that some dies usually produced boards thicker in the center than at the edges while other dies usually produced boards thinner in the center.

Referring to FIG. 3, another die was designed and built made with a pair of die lips 20 and 21 and attached to a die body. The die lips were mirror images of each other and were semicircular from the top view with a radius of curvature of 0.625 inch. Within each lip a cavity 23 was machined with a smoothly sloping surface at 24 from the bottom of the cavity to the perimeter of the die lip. The intersection 25 of the slope and perimeter is called the die land. The die land may be a sharp edge or it may be flattened to any desirable degree.

A channel was machined within the die body such that the hot-unfoamed material 22 being admitted to the die was uniformly introduced into the cavity between the die lips. The non-foamed, expandable material could then exit from the die only by passing through the gap 27 between the lands of the die lips. A key 26 measuring 0.06 by 0.06 inch was set into each side of the die body such that the end of the key could be positioned into the ends of the die gap, in the same way as that shown for key 44, FIG. 6. The key functions to form a bow tie shaped gap similar to the gap 19 of FIG. 2d.

Referring to FIGS. 4a-4f, the lips 20 and 21 were fastened to the body in such a way that they could be adjusted to form a uniform gap 29, FIG. 4b, or to close the gap more in the center 30, FIG. 4d, than at the ends or to open the gap more in the center 31, FIG. 4f, than at the ends. These adjustments compensate for a foam board which is too thin or too thick in the center thereby correcting the defect. Such adjustments are not possible to any marked extent with an ordinary slot or slots which are shaped as bow ties 9 and 11, FIG. 1a and FIG. 1c.

The bow tie 11, FIG. 1c, may be visualized as a special case of this new board die, for if each is viewed from the front, the projected area of the orifice increases toward the extremities of the projection.

FIG. 5a illustrates the top views of semicircular die lip 32; FIG. 5b, a parabolic die lip 33; and FIG. 5c, a triangular die lip 34 with the foaming board 35, 35a, and 35b, issuing from them. None of these have been established as a preferred shape. The shapes illustrated in FIGS. 5a, 5b, and 5c are only typical of the many shapes which could be employed in various embodiments of the invention.

In the embodiment of the invention shown in FIGS. 6a and 6b, a design is shown that is suitable for commercial production extrusion process. The die lips shown have a semicircular shape 36. The lips are securely fastened to a die body 37 with bolts 38 which pass through oversize holes 39 in the lips thereby permitting each lip to be moved transversely through a distance of, for example, 0.150 inch while still being restrained against the body. The minimum distance between the lips may be, for example, 0.100 inch. By adjusting both lips toward or away from each other, the gap between them may thus be opened or closed through a distance of 0.100 to 0.400 inches.

Three jack screws 40 are threaded through bolster plates 41 and press against each die lip. The bolster plates 41 are securely fastened at 42 to the die body. Three clamp screws 43 pass freely through oversize holes in the bolster plate 41 and are threaded into the die lips. A square key 44, 0.40 by 0.40 inch, was set in the die body in a 0.10 inch deep keyway which was also the width of the die land 44a.

The operator assigned to manipulate the machinery may open or close either side of the die gap or the operator may open or close the center of the die gap, all independently of each other, by adjustments of the appropriate jack screw 40 and clamp screws 43. In this way, the operator may swing the lips relative to each other and move the lips to close or open the gap uniformly causing the foam board to be uniformly thinner or thicker as required, and he may also correct for uniformity of the board cross section by adjustment of the appropriate jack and clamp screws.

The experimental board die illustrated in FIGS. 3 and 4a-4f worked very well to produce nearly rectangular boards as large as 2 inches thick by 5 inches wide. The shortcomings of the ordinary bow tie shape introduced by the key 26 become significant on the minor surfaces, or edges, of the thicker boards. By extrapolation, it is easily seen that a square foam cross section from the board die could be controlled with the adjustable lips only on two sides; the other two sides are subject to the limitations of the bow tie shape of the key for control.

FIGS. 7a and 7b show a die with symmetrical control for all four surfaces. The die is a hemispherical steel shell 45 affixed to a flange 46 for mounting to the extrusion equipment. Other shapes such as parabolic, conical, oblate spheriod, prolate spheroid, are typical of those which may be embodied in the die to suit varying conditions. This die was approximately 5/8 inch diameter and produced foam planks about 2 inches square. The corners of the planks were very sharp and well defined. The surfaces were uniform and flat. The front view of FIG. 7b reveals the orifice 47 as a bow tie in a symmetry of four.

Control for this die was achieved as shown in FIG. 7a by bending the steel lip 48 more open 49 or conversely depending upon whether more or less material was desired to leave the die to produce symmetry in the foam plank. A set of jack screws could be provided to bend the lips thus allowing adjustments during plank extrusion.

FIG. 8a illustrates a convex ended die having an orifice 50 which may be expected to produce rectangular planks rather than the square which was produced by orifice 47. The orifice 51 in the die shown in FIG. 8b would produce a much thinner plank, more properly termed a board.

FIGS. 9a, 9b, and 9c show isometric side and front views respectively of another embodiment of the invention wherein a channel 52 which may be square or rectangular in cross section is machined within the die body 53. Four die lips 54 are attached to the die body in such a way as to allow some adjustment of the lips 54 as indicated at 55 to open or close the orifice 56. The lips 54 might resemble those, 20 and 21, earlier shown.

The foregoing specification sets forth the invention in its preferred practical forms, but the structure shown is capable of modification within a range of equivalents without departing from the invention which is to be understood is broadly novel as is commensurate with the appended claims.

The embodiments of the invention in which an exclusive property or privilege is claimed are defined as follows:

1. An extrusion die for extruding a homogeneous distribution of foaming polymeric material comprising, having the property of changing shape after it leaves said die,
    two spaced lips fixed to said die and extending therefrom disposed substantially in two parallel planes,
    the edge of said lips remote from said die defining an exit passage for said material,
    said lips extending beyond the end of said die in spaced relation to each other providing an open space there-between for material to move laterally relative to said lips,
    means supporting said lips on said die,
    and means to adjust the position of said lips relative to each other to control the shape of said passage,
    said exit passage being generally in the shape of a bow tie having inwardly curving sides,
    said lips are movably connected to said die to swing about spaced parallel axes whereby said lips may be moved to converge toward each other or to diverge from each other,
    and means to hold said lips selectively in converging position or in diverging position.

2. The die recited in claim 1 wherein two second lips are provided,
    said second lips being disposed in two planes generally parallel to each other and perpendicular to the planes which contain said first mentioned lips,
    and means to adjust said second lips toward and away from each other.

3. The die recited in claim 1 wherein means is provided on said die to adjust said lips toward and away from each other.

4. The die recited in claim 1 wherein said lips are spaced from each other and define a gap extending around the periphery of said lips from adjacent one end of said pivot to a position adjacent the other end of said pivot.

5. The die recited in claim 4 wherein said lips are straight along the edge adjacent said pivotal axes,
    and said lips curve outwardly from said pivotal axes.

6. The die recited in claim 5 wherein said curve outwardly from said axes is substantially the form of a semi-circle.

7. The die recited in claim 1 wherein said die is made from a hollow member having a substantially hemispherical end, and means is provided on said die for attaching said die to an extrusion means and a bow-tie shaped gap in said hemispherical end.

8. The die recited in claim 1 wherein said die has four lips and said lips terminate at their distal end in a convex shaped end.

9. The die recited in claim 4 wherein said lips are substantially straight along the edge adjacent said pivotal axes, and said lips extend outwardly from said pivotal axes in the form of a paraboloid.

10. The die recited in claim 4 wherein said lips are substantially straight along the edge adjacent said pivotal axes, and said lips extend outwardly from said pivotal axes in the form of a triangle.

11. The die recited in claim 1 wherein said die is made from a hollow member having an end substantially in the form of a paraboloid, and means is provided on said die for attaching said die to an extrusion means and a bow-tie shaped gap in said parabolic end.

12. The die recited in claim 1 wherein said die is made from a hollow member having an end substantially in the form of a cone, and means is provided on said die for attaching said die to an extrusion means and a bow-tie shaped gap in said conical end.

13. An extrusion die for extruding foaming material comprising, two spaced plates, means supporting said spaced plates in spaced relation to each other, lips, said lips being generally semi-circular in shape, said lips each having the side thereof adjacent the other said lip recessed to form a cavity, said cavity being defined by a generally flat perimeter surface joining a surface extending inward toward the center of said lip and toward the side of said lip opposite said cavity, means for supporting said lips on said die between said spaced plates, and means to adjust said lips toward and away from each other and to adjust the inclination of said lips relative to each other whereby a gap defined between said lips is varied in shape.

14. The die recited in claim 13 wherein said means to support said lips on said die comprises a bore in each said lip, a rod extending through said bore and supported on said die, said bore through said lip being substantially larger than said rod, and means to adjust the position of said lips on said rod whereby said lips are adjusted relative to each other.

15. The die recited in claim 14 wherein said means to adjust said lips relative to each other comprises bolts.

16. The die recited in claim 15 wherein jacking screws are threadably supported in said plates and extend through and engage said lips whereby said lips may be rocked relative to each other on said rods.

17. The die recited in claim 13 wherein said lips define a gap having four edges, said four edges curve toward the others at their center.

18. The die recited in claim 13 wherein said lips are of approximately equal length and width.

19. The die recited in claim 13 wherein the ends of said lips are arcuate in shape and the center part of said ends curves inwardly toward the other end.

20. The die recited in claim 13 wherein all sides of said lips are arcuate in shape and said arcuate shapes curve toward each other whereby a bow-tie shaped gap is defined.

* * * * *